T. BYRNE.
Leeway Indicator for Vessels.
No. 56,003.
Patented July 3, 1866.
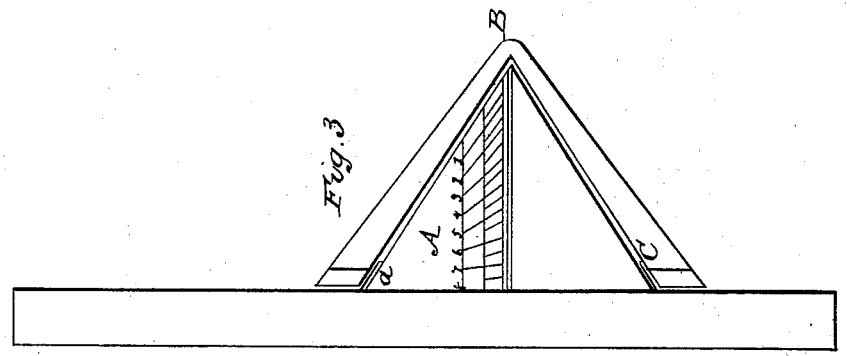
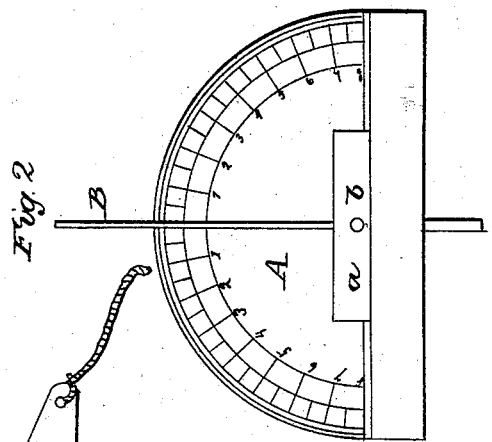
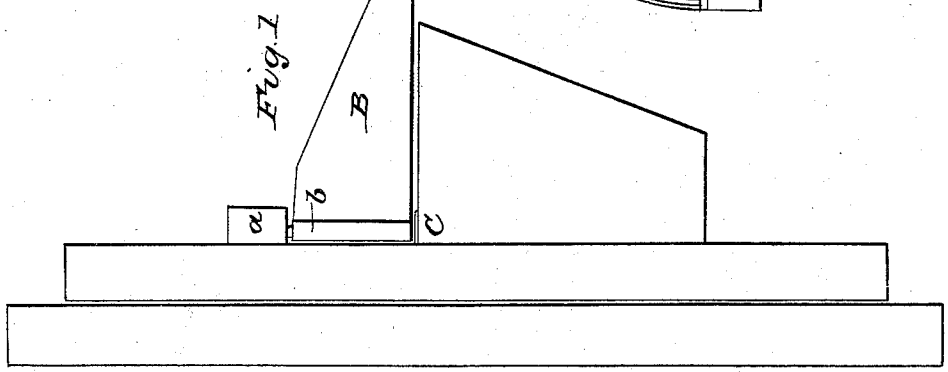
WITNESSES
INVENTOR

UNITED STATES PATENT OFFICE.

THOMAS BYRNE, OF NEW YORK, N. Y.

LEEWAY-INDICATOR FOR VESSELS.

Specification forming part of Letters Patent No. 56,003, dated July 3, 1866.

*To all whom it may concern:*

Be it known that I, THOMAS BYRNE, of New York, New York county, State of New York, have invented a new and Improved Leeway-Indicator for Vessels; and I do hereby declare the following description and accompanying drawings are sufficient to enable any person skilled in the art or science to which it most nearly appertains to make and use my said invention or improvements without further invention or experiment.

The nature of my invention and improvements consists in affixing to a vessel a card, plate, or other suitable device having points and fractional points of the compass inscribed thereon, and having an index-finger arranged to work freely over it, and connected to a float in the water, for the purpose of indicating the leeway made by the vessel in a head wind.

In the drawings, Figure 1 is a side elevation of my invention. Fig. 2 is a plan view, and Fig. 3 is a side elevation of a variation in the form of the apparatus.

The same letters refer to similar parts in all the drawings.

A represents the graduated plate, formed of any convenient material, and semicircular in shape. This plate is intended to be located at any convenient point in the after part of the ship, and on or parallel with the deck.

B represents the index-finger, attached at its rear end to a pin, $b$, fixed exactly at the middle of the straight side of the plate.

$a\ c$ represent bearings, in which the pin $b$ turns freely, in order that the index-finger may indicate at the slightest force exerted upon it any one of the points described at the circumference of the plate A. Of these points the central is marked $o$, and the plate is situated so that the radius of the semicircle, of which the point $o$ forms one extremity, shall lie in vertical plane parallel with that in which lies the keel of the vessel. On each side of $o$ a quarter part of the points of the compass are marked, and are numbered 1, 2, 3, &c., in an ascending scale toward the extremities of the semicircle.

A line of any required length is attached at one end to the outer extremity of the index-finger, and, running thence over the ship's stern, is fastened at the other end to a leaden weight or such other device in the water as shall be sufficient to draw the line taut when the ship is under headway. The line being drawn taut will, of course, pull upon the index-finger and cause it to register accurately upon the graduated plate whatever leeway the ship may be making. If the leeway is made to starboard, the index-finger will be drawn to port, and vice versa, the plummet following in the wake of the ship.

It will be seen from this description that there is nothing to prevent this apparatus from working with absolute correctness, the line presenting the least possible surface for the wind to act upon, while the plummet may be of such weight as to prevent even the slight deflection arising from this source.

The points of the compass forming the graduated card may be inscribed upon a globe or section of a globe, or on a cone or section of a cone. Of these forms the conical would seem to be the best, as in that case the index-finger would be nearly on a line with the cord acting upon it. The axis of the cone or globe or section of either on which the graduated plate is supported may be at any angle with the level of the deck, provided only that the right line joining the point $o$ and the pivot of the index-finger shall lie in a vertical plane parallel with that passing through the keel of the ship.

When a flat plate is used the apparatus may be attached to the ship by a center-pin, so that it may oscillate to port and starboard so far as to enable the indicating-finger to point in the same line with the connecting-cord.

A card with points of the compass inscribed thereon fixed to a vessel and provided with an index-finger operated by a line dragged after the vessel is not new; but the double bearing for the hinge of the index-finger, as shown in Fig. 1, the double hinge for the purpose of preventing the index-finger from rubbing the face of the card, as shown at Fig. 3, a globular or conical support for the card for the purpose of bringing the index-finger in the same direction with the cord connecting it with the plummet, and an oscillating support for the card for the same purpose, are new. These devices may all be embodied in the combination of an index-finger arranged to move over the card, or a card arranged to move under a fixed index-finger.

What I claim as new, and desire to secure by Letters Patent, is—

An apparatus for indicating the leeway of a vessel, consisting of a graduated plate attached to an oscillating support, whether such support presents a plane, conical, or globular surface, and of an index-finger operated by a cord and a plummet or other equivalent device in the water, and vibrating on a fixed pivot with a double support or on double hinges, substantially as and for the purpose set forth.

THOS. BYRNE.

Witnesses:
   GEO. E. BROWN,
   W. R. HERRING.